Aug. 13, 1963

V. K. PELTOLA 3,100,397

PYROMETER APPARATUS

Filed March 5, 1958

Inventor:
Veikko K. Peltola
By Silverman, Mullin & Cass
Attorneys.

Aug. 13, 1963

V. K. PELTOLA 3,100,397

PYROMETER APPARATUS

Filed March 5, 1958

Inventor:
Veikko K. Peltola
By Silverman, Mullin & Cass
Attorneys.

United States Patent Office 3,100,397
Patented Aug. 13, 1963

3,100,397
PYROMETER APPARATUS
Veikko K. Peltola, Chicago, Ill., assignor to Illinois Testing Laboratories, Inc., Chicago, Ill., a corporation of Illinois
Filed Mar. 5, 1958, Ser. No. 719,247
16 Claims. (Cl. 73—359)

This invention relates generally to pyrometry and more particularly is concerned with the construction of a novel pyrometer apparatus intended especially for use in measuring temperatures which vary over moderate ranges in the vicinity of zero to several hundred degrees Fahrenheit.

A simple pyrometer involves the use of a thermocouple in which the output of the thermocouple, which is of the order of several millivolts, is applied to a moving coil type of galvanometer calibrated to read temperature in degrees. The galvanometer includes a coil of wire mounted for pivotal swinging movement in a permanent magnetic field. The flow of current caused by the potential across the thermocouple applied to the meter circuit including the coil flows through the coil and produces a torque in the coil which is sufficient to overcome the bias of a spiral spring normally holding the coil in a zero position. A needle or pointer secured to the coil traverses the scale and comes to rest when the torque of the coil equals the increased torque of the spring in the new position of the coil.

The conventional pyrometer apparatus uses a galvanometer in which the coil is mounted on a form which is provided with pivots mechanically journalled in bearings. The apparatus must be carefully calibrated for the particular thermocouple used because the resistance of the thermocouple is a substantial percentage of the total resistance of the system, including the resistance of the meter coil, compensating resistors, etc. The disadvantage of this arrangement, of course, lies in the fact that if remote readings must be made, the meter must be calibrated for a considerable length of thermocouple wire, which decreases the sensitivity due to the resistance of the thermocouple wire. This is caused by the fact that the thermocouple is a low impedance device and must of necessity operate into a relatively low impedance measuring circuit. The changes in the impedance of the thermocouple connecting leads are a substantial change in the overall resistance of the circuit, which has a marked effect upon the sensitivity and accuracy of the device. One condition of calibration is useless where the thermocouple is lengthened or shortened substantially.

Other disadvantages are attendant upon the use of the conventional pyrometer with a cold junction thermocouple. Principally, the physical characteristics of such pyrometer apparatus place limitations upon the sensitivity of the equipment. Thus, these limitations have decreased the utility of such instruments. The sensitivity of an instrument suitable for use in the range, say up to 300° Fahrenheit, using an iron-constantan thermocouple with an output of approximately 8 or 9 millivolts, will run between 15 and 20 ohms per millivolt for a high quality meter whose moving parts are carefully made. The higher value of sensitivity, i.e., 20 ohms per millivolt is most unusual for meters operating over this range. A sensitivity of 20 ohms per millivolt and higher is generally characteristic of instruments operating at substantially higher temperatures in which the voltages being generated by the thermocouples are substantially more than 8 or 9 millivolts.

The primary object of this invention is to provide a pyrometric apparatus which has a sensitivity substantially higher than any apparatus heretofore known using mechanically pivotal movements. In achieving this object, as will be brought out hereinafter, there has also been provided a pyrometer which is rugged, economical, portable, compact, stable and reliable.

A simple version of the invention had a sensitivity of the order of 80 ohms per millivolt, and even greater sensitivities are easily achieved through the application of the invention.

The characteristics of a pyrometer of the type with which this invention is concerned, namely one in which the apparatus includes an indicating pivoted coil d'Arsonval type of meter, are generally as follows:
 (a) Primarily, high sensitivity, as pointed out above.
 (b) Damping factor close to unity.
 (c) High torque to weight ratio.

An important object of the invention, in addition to the object set forth above, is to achieve the characteristics designated (b) and (c) and to achieve the same in an instrument which is relatively economical and simple to construct and easy to operate with accurate and reliable results.

The three factors named above are in nowise independent, and should be considered together. Sensitivity is a measure of the response of the moving coil to a given stimulus, stated in the amount of resistance required to give a given deflection of unit voltage. Thus, if 50 microamperes flow in the coil to give a full scale deflection for a thermocouple output of 5.5 millivolts, the system resistance comprising 110 ohms, the sensitivity is 20 ohms per millivolt. There are several ways to increase the sensitivity. One could increase the number of turns in the coil and/or decrease the strength of the spring which retains the meter pointer at zero. These expedients will affect the other characteristics adversely, as will be seen.

Damping factor is not as important a consideration as the other two factors. It is, nevertheless, a measure of the speed of response of the meter movement, that is, its ability to quickly move to a position indicative of the function applied to the meter and assume that position without unnecessary overshoot and rebound. Since damping factor is defined as the ratio of the total millivoltmeter circuit resistance required for critical damping (critical damping being a condition in which the pointer will move to a position representative of the application of a step voltage without any overshoot) and the actual total circuit resistance of the calibrated instrument, it is desirable to have high total circuit resistance. Factors of 1 to 1 are obviously best but factors up to 4 to 1 are not completely undesirable, if they come as a result of compromise for other undesirable characteristics. For example, an increase in the number of turns, required to increase sensitivity would increase the damping factor.

The third factor is torque to weight ratio and this is a figure of merit of a moving coil galvanometer which depends upon the dead weight of the moving parts, and the strength of the spring. It is desirable to have this factor high, since high torque to weight ratio decreases the effect of pivot friction and protects the meter movement against vibration and shock. The factor can be increased by decreasing the number of turns of wire of the coil or increasing the strength of the spring. Both of these changes would, of course, decrease sensitivity. Obviously, where the pointer, balance weights, quadrant and coil frame are made light in weight, there will be a sacrifice of strength and ruggedness.

The above description clearly points out that the conventional pyrometer apparatus is not easily designed to get the maximum of benefits therefrom. All of these factors must be considered, and the requirements of the particular use also placed in the balance, before a good instrument is evolved. A difficulty which is not uncommon is that an instrument which has been designed for one set of conditions is not suitable for use under another set of conditions. Thus, the conventional pyrometer apparatus as known is not flexible and applicable to a large variety of conditions. The invention herein has as an object the provision of a pyrometer apparatus which is very flexible in use and application.

The invention herein achieves the most desirable of the characteristics above described. An instrument constructed according to the invention has a damping factor which is rendered close to unity without any sacrifice to sensitivity and has a very high torque to weight ratio without sacrificing sensitivity, damping factor, or ruggedness.

There are objects and advantages of the invention which have not been provided in prior structures, and this follows because of a completely different construction of apparatus, as will be pointed out. The sensitivity of the apparatus has been increased because the number of turns of wire on the moving coil is greater than ever believed possible in a device of this kind. The input impedance of the device is rendered quite high through the novel circuit described herein, and because of this, the appreciable variation of the resistance to the low impedance source has little or no effect upon the overall calibration and response of the apparatus. The very low power output of the thermocouple is amplified through the use of a transistor in a bridge circuit incorporating the rugged temperature indicating meter.

The invention further contemplates certain novel objects achieved through the circuitry thereof. These include, without limitation, novel means for connecting the meter in the circuit, novel means for utilizing the characteristics of semi-conductors to achieve the desired characteristics of the specified measuring apparatus, novel temperature compensating means, and novel means for simple adjustment and use of the meter.

Further objects of the invention are concerned with the physical construction of the instrument in its pyrometric form which utilizes a novel heat sink for assuring stability of the device.

An important object of the invention is to provide a circuit in which a low impedance source is connected to provide the input to a transistor in a bridge circuit including a measuring device, the potential for energizing the bridge and the potential for biasing the transistor being the same D.C. source.

Other objects and advantages will occur to those skilled in this art, and hence the above are only by way of being typical of the attributes of the invention. In order to provide a complete understanding and appreciation of the invention, a detailed explanation and description thereof has been set forth hereinafter in connection with preferred embodiments thereof, and the drawings appended illustrate these preferred embodiments. Great variations in the minor details, in the size, shape, proportions and arrangements of the components and in the circuitry are capable of being made without in any way departing from the invention.

Generally in its pyrometric form the invention comprises an apparatus in which a transistor is used between the meter and the thermocouple of a pyrometer so that the relatively low impedance input of the transistor is fairly well matched to the thermocouple, while the output of the transistor is applied to a high impedance circuit containing the moving coil galvanometer. In effect, therefore, the transistor serves as an impedance transformer in the sense that it transforms the low impedance of the thermocouple to a high impedance for application to the meter. Actually, there is an additional advantage which is gained, and that is the power amplification which is achieved through the use of the transistor.

The high impedance output of the transistor operates into a circuit in which there is provided a galvanometer coil having a great many turns and a high critical damping resistance which provides the close-to-unity damping factor above described. Power amplification enables the springs of the meter to be made quite strong, much stronger than the springs of an ordinary pyrometer to be used in this range.

Figure 1:
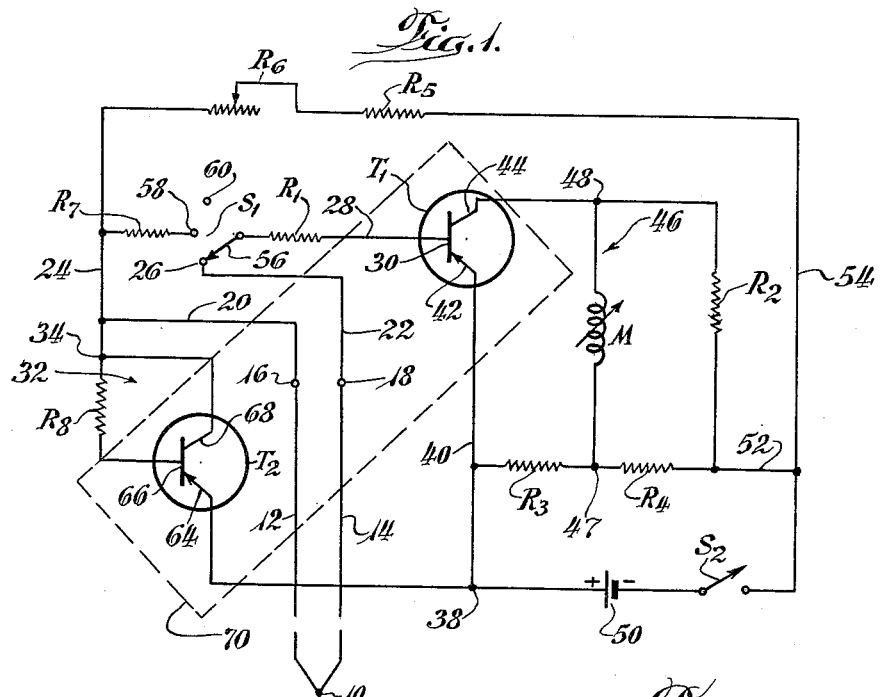
FIG. 1 is a circuit diagram of an apparatus constructed in accordance with the invention.

In FIG. 1 a typical circuit is illustrated. The test junction of the thermocouple is designated 10, and it is connected by the thermocouple leads 12 and 14 to the cold junction terminals 16 and 18 which form the positive and negative terminals of the thermocouple respectively. Leads 12 and 14 are formed of the dissimilar alloys which form the couple, and could be iron and constantan, respectively, for example. The leads 20 and 22 are copper and are connected respectively to common conductor 24 and the terminal 26 of the switch $S_1$.

If there is a difference in temperature between the hot or test junction 10 and the cold junction 16, 18 of the thermocouple, a potential will be developed across the terminals 16 and 18 which in conventional practice is applied directly to the millivoltmeter circuit. This is a direct current potential and its polarity will be determined by which of the junctions is the higher in temperature. Thus, for a given ambient or cold junction temperature the potential will be zero, and it will vary in opposite polarities when the hot junction varies on opposite sides of the cold junction temperature. The meter movement must therefore be adjusted for the cold junction temperature to read a value which corresponds to the temperature of the cold junction, notwithstanding there is no potential generated across the thermocouple terminals. For lower temperatures the polarity is conventionally arranged to cause the meter pointer to indicate less on the meter scale, and vice versa for higher hot junction temperatures.

In the apparatus of the invention, the potential of the thermocouple is "injected" into the base-emitter circuit of the transistor $T_1$ treating the thermocouple as a current-producing device, since the transistor is basically a current amplifier. The thermocouple 10 with its leads 12 and 14 is in series with the resistor $R_1$ in the lead 28 which is connected to the base 30 of the transistor $T_1$. The bias for the transistor $T_1$ is obtained through a voltage divider arrangement which includes a lower section designated generally 32 and an upper section including resistors $R_5$ and $R_6$. The lower section 32 has one side thereof connected at 34 to the common lead 24, and the other side thereof connected at 38 to the conductor 40 which in turn is connected to the emitter 42 of the transistor $T_1$.

The output of the transistor $T_1$ is taken between the emitter 42 and the collector 44 operating into a balanced bridge 46 in which the transistor output forms one leg adjacent a second leg having the resistor $R_2$ with the other two legs comprising the resistors $R_3$ and $R_4$. The moving coil of the meter is designated M and is connected across the balance terminals 47 and 48.

The transistor supply voltage is provided by a D.C. battery 50 whose negative terminal is connected through the switch $S_2$ to the junction of $R_2$ and $R_4$ designated 52. The conductor 54 connects the junction through the fixed series resistor $R_5$ and the variable resistor $R_6$ to the common lead 24.

From the above it will be seen that the battery 50 is connected across the voltage divider from the junction 52 to the terminal 38. The bias applied to the base will be related to the potential of the battery 50 as the impedance of the lower section 32 of the voltage divider is related to the sum impedance of the lower and upper sections including the resistors $R_5$ and $R_6$. The bias, and hence the operating point of the transistor $T_1$ can therefore be varied either by varying the value of the resistor $R_6$ or by varying the effective impedance of the section 32.

Considering the circuit as illustrated, with the arm 56 of the switch $S_1$ on the contact 26, the terminals 58 and 60 of the switch $S_1$ are not effective to vary the circuit. The thermocouple circuit is in series with the resistor $R_1$ and the base bias will be applied through this circuit. The lower section of the voltage divider consists of a transistor $T_2$ having its emitter 64 connected to the terminal 38, its base 66 connected through a relatively high ohmage resistor $R_8$ to the terminal 34, and having its collector 68 connected directly to the terminal 34. The majority of the current flowing through the transistor $T_2$ will take the path through the emitter and collector such that the total effective resistance is somewhat of the order of the upper section of the voltage divider. The transistor $T_2$ is temperature sensitive, and hence its resistance will vary with temperature. Thereby, the bias of the transistor $T_1$ will also vary, and hence the section 32 of the voltage divider may be considered a temperature-sensitive variable impedance. Preferably its change in resistance should be chosen to provide compensation in the bias for the changes in operating point of the transistor $T_1$ caused by its temperature sensitivity. Instead of the transistor $T_2$ and its resistor $R_8$ negative temperature coefficient elements such as thermistors, and diodes, either with or without compensating network could be used.

The circuit described is a D.C. amplifier in which the emitter is common to both the input and output. Effectively both voltage and current are amplified and hence this may be considered a power amplifier. The input of this type amplifier is relatively low, namely of the order of one or two thousand ohms, while the output is of the order of 30,000 ohms. This is for an ordinary p-n-p transistor of common type. The circuit which will be described hereinafter uses a voltage for the battery 50 of only several volts and the transistors are operated substantially below their ratings in order to provide long, trouble-free service. Consequently the output impedance is of the order of substantially less than 30,000 ohms, being in this case of the order of 3,000 ohms.

The switching arrangement for the apparatus is for operation and testing. The contact 26 is used when the thermocouple is connected into the circuit. The contact 58 is a test terminal in which a passive dummy element, namely the resistor $R_7$, is connected into the circuit of the transistor $T_1$. The passive element has substantially the same resistance as the thermocouple circuit, and hence when it is connected the effect will be the same as though the cold and hot junctions were at the same temperature producing zero output potential. Under these circumstances, adjustment of the bias through the varying of the resistor $R_6$ will produce an output for the transistor $T_1$ which, when applied to the bridge 46 will move the needle or pointer of the meter to the temperature represented by that of the cold junction. This temperature is measured in a manner presently to be explained.

The switch $S_2$ is preferably ganged to operate with the switch $S_1$ so that switch $S_2$ is closed when the arm 56 is on contacts 26 and 58 but is open when the arm 56 is on contact 60, the latter being an "off" position. Switch $S_2$ is needed to prevent flow of current through the transistor $T_2$ when the apparatus is not in use.

In order to provide additional temperature stability, the temperature sensitive elements advantageously are all located within a common heat sink which is diagrammatically shown in FIG. 1 by means of the broken line rectangle designated 70. The cold junction terminals 16 and 18, the two transistors $T_1$ and $T_2$, and a thermometer are all located within this heat sink 70.

Figure 3:
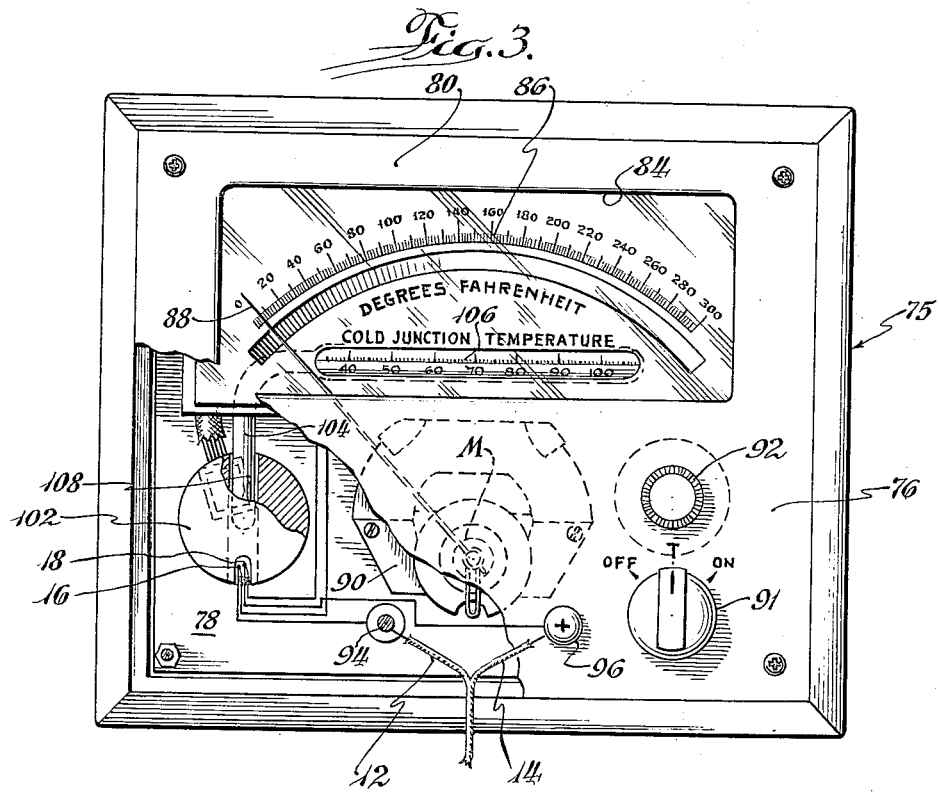
FIG. 3 is a top plan view of a pyrometer apparatus utilizing the circuit of FIG. 1 with portions broken away and in section to show details of construction thereof.
Figure 4:
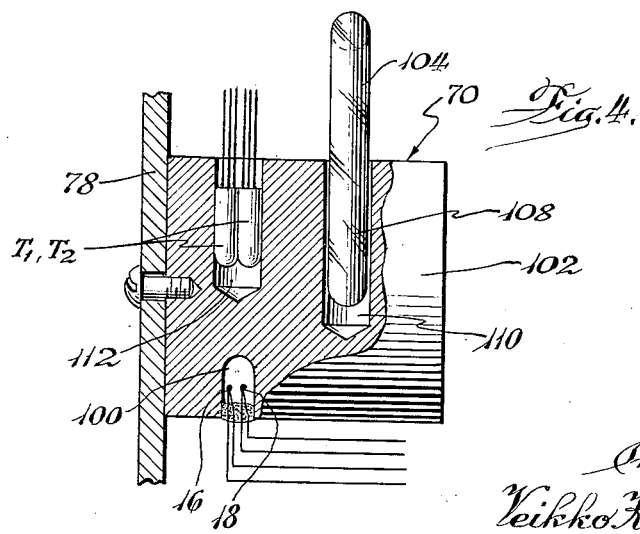
FIG. 4 is a sectional view through the heat sink illustrated in FIG. 3 taken approximately along a vertical plane.

Attention is now invited to FIGS. 3 and 4 which illustrate a practical example of a pyrometer apparatus constructed in accordance with the invention. The usual techniques employed in the construction of self-contained instruments of this kind need not be mentioned herein. The instrument is designated generally 75 and is mounted in a housing 76 which includes a chassis 78 (FIG. 4) mounting various of the components. A panel 80 is positioned on top of the housing 76 and same has a window 84 through which the scale 86 can be seen. The needle or pointer 88 of coil M of voltmeter movement 90 is shown arranged to swing over the scale, which is calibrated in degrees Fahrenheit. The switches $S_1$ and $S_2$ are mounted on the panel and controlled by a single knob 91. The three positions thereof are designated by suitable indicia on the panels as "Off," "T" and "On." These positions correspond to the arm 56 engaging the contacts 60, 58 and 26 respectively with appropriate conditions of switch $S_2$. The knob 92 shown on the top of the panel 80 is connected with the adjustable resistor $R_6$.

The thermocouple leads 12 and 14 are connected to binding posts 94 and 96 which extend to the cold junction terminals 16 and 18. These are mounted in the recess 100 which is formed in the large block of metal 102 which is suitably mounted on the chassis 78. In this instrument 75 I have formed the block of a cylindrical member of aluminum. The junction 16 and terminal 18 are sealed into the recess 100 by any suitable material such as wax.

For the purpose of measuring the temperature of the cold junction 16, which will usually be the ambient temperature, there is provided an L-shaped mercury-in-glass thermometer 104, the scale 106 of which is displayed in the window 84 below the scale 86. The mercury bulb 108 is disposed within a recess 110 provided in the block 102. Another recess 112 is formed in the block 102 and the two transistors $T_1$ and $T_2$ are inserted therein. Since the transistors are so small this poses no problem, and the wires connecting the same into the circuit are readily extended from the recess 112.

Great temperature stability is achieved through the use of this metal block, since its temperature changes slowly and its mass provides a substantially identical temperature for all of the components buried therein.

In using the device, the switch $S_1$ is first turned to T position, which corresponds to placing the arm 56 on the contact 58. This connects the resistor $R_7$ to the base 30 of transistor $T_1$, by-passing the thermocouple 10 and its circuit. The thermometer 104 is then read, and the resistor $R_6$ is adjusted until the needle 88 is disposed upon the scale 86 at a temperature which corresponds to the temperature read upon the scale 106. This is the cold junction adjustment. It provides a condition of output of the transistor $T_1$ which, when operating into the bridge 46 provides a balance condition moving the needle of the meter 90 to a position representing no output provided by the thermocouple. This would be the condition in which the temperature of the hot and cold junctions was identical. Such an adjustment is not technically needed in an instrument of this kind, but practically, it is time-consuming to wait for the heat sink to reach ambient temperature affecting the hot junction. Furthermore, this time may be so long that the ambient and heat sink temperatures are substantially always different.

This measurement of the heat sink temperature by the thermometer 104 and adjustment of the needle or pointer 88 to the temperature thereof with the dummy resistor $R_7$ connected in the circuit is feasible because the voltage of the thermocouple is substantially directly proportional to difference in temperature. Furthermore, the response of the transistor $T_1$ is easily adjusted to be substantially a straight line function over the relatively small ranges intended to be measured by this instrument. Differences between actual functions for given operating conditions and actual linear functions can be taken into consideration in constructing the scale 86 of the meter.

Since the overall resistance of the input circuit of the apparatus is primarily controlled by the value of the resistance $R_1$, and this is chosen of the order of a hundred times the resistance of the thermocouple circuit, variations in the resistance of either the dummy resistor $R_7$ or the overall resistance of the thermocouple circuit are of no consequences. Thus, the thermocouple leads 12 and 14 may be varied in length without substantially affecting the accuracy of the readings.

Typical values of the practical version of the instrument 75 are as follows:

| | |
|---|---|
| $T_1$, $T_2$ | 2N35. |
| 50 | Two 1.3 volt cells. |
| $R_1$ | 2000 ohms. |
| $R_2$ | 3000 ohms. |
| $R_3$ | 1000 ohms. |
| $R_4$ | 1000 ohms. |
| $R_5$ | 6700 ohms. |
| $R_6$ | 0–500 ohms. |
| $R_7$ | 25 ohms. |
| $R_8$ | 8000 ohms. |

The thermocouple 10 was an iron-constantan couple and the total range was zero to 300° F. The meter was a permanent magnet type of fairly conventional construction, having 175 turns of No. .0025″ gauge copper wire. The total resistance of the coil was 75 ohms. Considered as a whole, the effective circuit resistance of the meter circuit was 720 ohms to give the high sensitivity of 80 ohms per millivolt.

In considering the apparatus described, one might treat the circuit of the transistor $T_1$ as an impedance transformer, in which the low impedance thermocouple is applied to the primary of the transformer (the base-emitter circuit), and the secondary of the transformer (the emitter-collector circuit) is a high impedance output connected to the high impedance circuit of the meter. The meter in this case happens to be in a bridge circuit and the transistor output is connected into the bridge as a branch thereof balancing an arm which has an impedance of the order of 3000 ohms in the example described. This is substantially less than the output impedance of the ordinary transistor of this type, but it is preferred to operate the transistors at considerably below their rated currents and potentials. This results in long life, smaller batteries, and greater sensitivity in the bridge circuit.

The essential difference between the circuit described and the ordinary concept of the transformer is that the transistor circuit when serving as an impedance transformer at the same time also amplifies the power of the input signal and operates at D.C. Ordinary transformers with magnetic circuits cannot be used, of course, because they are not affected by D.C. signals unless the signals are pulsed, an expedient requiring expensive, bulky, and complex apparatus. Ordinary electronic tubes cannot be used for the purposes described herein because of difficulties with their high input impedance. Electronic tubes have other disadvantages which render them unsuitable for use in an instrument of this kind, including high heat generated, high power requirements, large size and weight.

Figure 2:
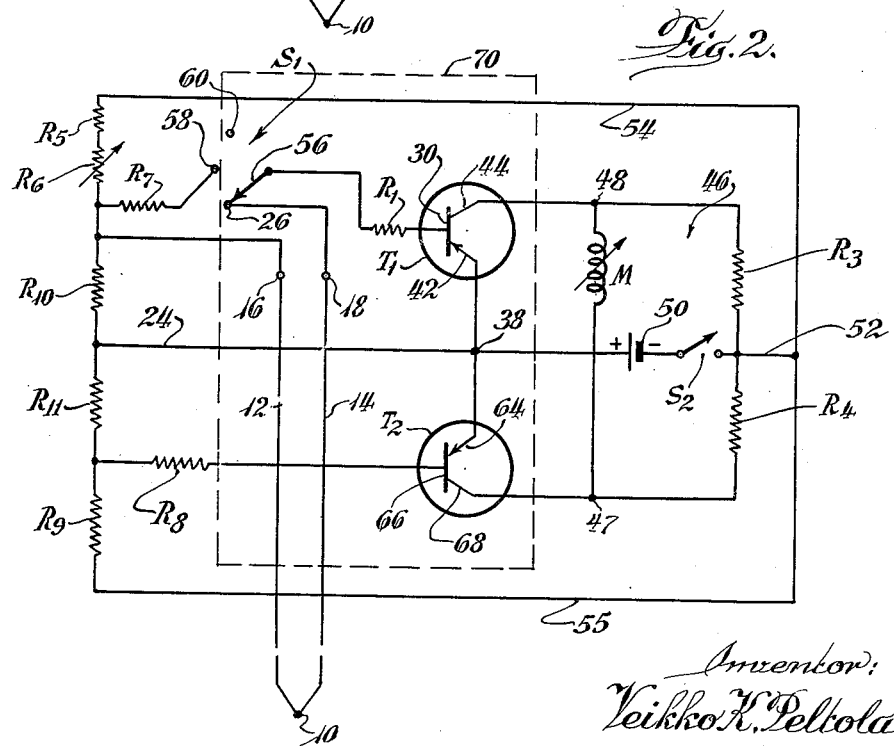
FIG. 2 is a modified form of the same.

FIG. 2 is a circuit diagram of a modified form of the invention in which the circuit comprises a balanced arrangement having the transistor $T_1$ again serving as an impedance matching device and a power amplifier, but in which the bridge circuit 46 is formed of the two transistors $T_1$ and $T_2$ connected in balanced opposition. The collectors 44 and 68 of the respective transistors are connected across the galvanometer coil M and the emitters 42 and 64 are connected to the terminal 38 which in turn is connected to the positive side of the battery 50. The other legs of the bridge 46 are provided by the resistors $R_3$ and $R_4$. Bias for the two transistors $T_1$ and $T_2$ is provided by a voltage divider arrangement in which the resistors $R_5$, $R_6$, $R_9$, $R_{10}$ and $R_{11}$ are connected across the potential source 50, and the potentials applied to the respective transistors dependent upon the ratio of the various parts of the voltage divider to the whole.

The common conductor 24 is substantially a grounded lead in this circuit, and through this conductor and the base, fixed bias is applied to the transistor $T_2$ as controlled by the values of the resistors $R_{11}$ and $R_8$. In the case of the transistor $T_1$, its bias is applied through the resistors $R_{10}$ and $R_1$ but in series with the circuit of the thermocouple 10 including its leads 12 and 14. Obviously the bias of the transistor $T_1$ is variable depending upon the potential generated by the thermocouple as a function of the difference in temperature between its hot junction 10 and its cold junction 16, 18. The circuit is balanced for zero difference in temperature between the junctions through the use of the variable resistor $R_6$ connected with the negative terminal of the battery 50 through a terminal 52 and switch $S_2$ by the lead 54. A balancing resistor $R_9$ is connected also to the negative terminal of the battery 50 through the same terminal 52 and switch $S_2$. Under these circumstances, that is, for zero difference in temperature between the hot and cold junctions, the meter movement M should be moved to cause the needle or pointer 88 to indicate the temperature of the cold junction 16, 18. Obviously therefore, the bridge 46 will not be perfectly balanced, there being a greater output from the transistor $T_1$ than the transistor $T_2$, presuming all else is balanced.

This cold junction adjustment is made substantially in the same manner as the adjustment described in connection with the circuit of FIG. 1. The identical meter 75 may be used in both cases. The switch $S_1$ is connected in the base lead 28 of the transistor $T_1$ with its arm 56 in series with the resistor $R_1$ movable over three contacts 26, 58 and 60. When the arm is on the contact 26 the thermocouple 10 is connected in the circuit, and the movement of the meter coil M is a function of the output of the transistor $T_1$ which in turn is a function of the potential developed across the terminals 16 and 18 of the cold junction. If the bridge 46 is constructed as a balanced arm bridge, and the transistors $T_1$ and $T_2$ are fairly well matched, the movement of the meter coil M will be directly proportional to the potential developed by the thermocouple. The operating conditions of the transistors should be basically the same, and the transistor $T_1$ should be operating on a straight portion of its characteristic so that its output is linear with respect to its base current. Inherently, the potential developed by a thermocouple is proportional to the change in temperature between its hot and cold junctions.

The cold junction adjustment is made by switching the arm 56 to the contact 58 whereby to connect a passive dummy element comprising a resistor $R_7$ in the base circuit of the transistor $T_1$ and disconnect the circuit of the thermocouple therefrom. The resistance of the resistor $R_7$ is chosen to be approximately the same as that of the thermocouple and its leads. The contact 60 is the "off" contact, and the switches $S_1$ and $S_2$ are ganged so that the switch $S_2$ is opened when the arm 56 is moved to the contact 60, and is closed at other times.

The circuit of FIG. 2 differs from the circuit of FIG. 1 in that in FIG. 1 the transistor $T_2$ served only as a temperature compensating device by having its impedance vary with temperature to compensate for the changes in the characteristics of $T_1$ caused by variations in temperature. In the case of the circuit of FIG. 1 the temperature compensation was accomplished in the input circuit of the transistor $T_1$. The output circuit of the transistor $T_1$ included a bridge in which the arm balancing the transistor $T_1$ was a passive resistor $R_2$ whose value was chosen, as closely as possible, to equal the output impedance of the transistor $T_1$. The temperature compensation was achieved by variation of the bias of the base-emitter circuit of the transistor $T_1$.

In the circuit of FIG. 2 the bias of the transistor $T_1$ is only varied by the temperature difference between the junctions of the thermocouple. No attempt is made to change the bias of the transistor $T_1$ to compensate for temperature changes. Instead, the bridge 46 is balanced for impedance by a matched transistor $T_2$ so that the basic impedance is provided in a balance arm substantially the same in character as that of the transistor $T_1$. In addition, in the circuit of FIG. 2, any temperature change which is effective to change the characteristics of the transistor $T_1$ will do likewise to the transistor $T_2$, and since both are connected directly in the bridge 46, they will balance one another. This arrangement provides closer compensation, under certain conditions of operation of the transistors, than that provided merely by changing one of the transistor parameters as in the case of FIG. 1.

Again as in the case of the circuit of FIG. 1, the temperature sensitive elements of the apparatus are enclosed in a heat sink 70.

A practical circuit constructed in accordance with FIG. 2 had the following constants:

| | |
|---|---|
| $T_1$, $T_2$ | 2N265. |
| 50 | Two 1.3 volt cells. |
| $R_1$ | 2000 ohms. |
| $R_3$ | 3000 ohms. |
| $R_4$ | 3000 ohms. |
| $R_5$ | 4000 ohms. |
| $R_6$ | 0–5000 ohms. |
| $R_7$ | 25 ohms. |
| $R_8$ | 2025 ohms. |
| $R_9$ | 8500 ohms. |
| $R_{10}$ | 500 ohms. |
| $R_{11}$ | 500 ohms. |

The same thermocouple and meter were used. Note that an attempt was made to balance the inputs to the two transistors $T_1$ and $T_2$ by providing the total series resistance in both circuits to be substantially equal. The resistance of $R_1$, the thermocouple, and $R_{10}$ totals 7025 ohms, while the total resistance of the resistors $R_{11}$ and $R_8$ is the same value. The thermocouple has an effective resistance of 25 ohms.

The circuits explained in connection with FIGS. 1 and 2 have their basic constructions in common, as will be obvious from the explanations set forth above. One of the important features of the invention, as set forth in the objects, is the use of a common D.C. source of potential for driving the bridges and also supplying the bias for the transistors. In other words, looking in FIG. 1, the battery 50 is connected across the potential terminals of the four arm measuring bridge, thereby energizing the bridge. The battery 50 is also connected across a voltage divider which in this case comprises the transistor $T_2$ (or lower section 32) and the resistors $R_5$ and $R_6$ (or upper section). This structure is most unobvious, and extremely economical, making for a compact instrument. The circuit of FIG. 2 also provides this arrangement, with the exception that the second transistor T also has its bias provided by the source of potential 50 which is across the bridge.

The invention has been explained in considerable detail, and the construction of apparatus should be readily understood by those skilled in this art without further elucidation. The novel application of transistors to pyrometry has given rise to great advantages which will be appreciated from the unusual flexibility and sensitivity achieved. The use of the peculiar characteristics of semiconductor devices for impedance transformation and power amplification for the purposes set forth hereinabove is believed novel and hence it is desired to point out that considerable variation in circuitry and application is completely feasible within the framework and scope of the invention as defined in the appended claims. Just as an example, the circuit of the pyrometer apparatus may at once contain means for compensating for temperature in the input and output circuits of the impedance transforming means, such as for example, a thermistor in the input and a semi-conductor in the output. Other modifications will suggest themselves to those who work with apparatus of this kind.

What it is desired to secure by Letters Patent of the United States is:

1. A pyrometer circuit which includes a thermocouple having a hot junction ad a cold junction and providing a relatively low impedance output at its cold junction, an amplifier circuit including a three-element semi-conductor device having a terminal for each element, the input circuit for said amplifier circuit being between a first and second of said elements, the output of said amplifier circuit being between said second and the third of said elements, power means for supplying the potential to said circuit, and means for biasing said input circuit, a moving coil galvanometer circuit having a relatively high input impedance and being connected between said second and third elements, said thermocouple being connected in series with said input circuit, a temperature-sensitive means connected with said biasing means having a characteristic changing the bias to compensate for temperature changes in the characteristics of said semi-conductor device, and means for maintaining said cold junction, said semi-conductor device, and said temperature-sensitive means at substantially the same temperature, said temperature-sensitive means comprising a current carrying device whose impedance varies inversely with temperature.

2. A pyrometer circuit which includes a thermocouple having a hot junction and a cold junction and providing a relatively low impedance output at its cold junction, an amplifier circuit including a three-element semi-conductor device having a terminal for each element, the input circuit for said amplifier circuit being between a first and second of said elements, the output of said amplifier circuit being between said second and the third of said elements, power means for supplying the potential to said circuit, and means for biasing said input circuit, a moving coil galvanometer circuit having a relatively high input impedance and being connected between said second and third elements, said thermocouple being connected in series with said input circuit, a temperature-sensitive means connected with said biasing means having a characteristic changing the bias to compensate for temperature changes in the characteristics of said semi-conductor device, and means for maintaining said cold junction, said semi-conductor device, and said temperature-sensitive means at substantially the same temperature, said temperature-sensitive means compressing a second semi-conductor device of characteristics similar to said first mentioned semi-conductor device connected in series with said input circuit.

3. A pyrometer circuit which includes a thermocouple having a hot junction and a cold junction and adapted to provide a potential at its cold junction proportional to the difference between the temperature of the junctions, a three-element semi-conductor device having an input circuit with the cold junction connected in series therewith extending across the first and second of said elements, an output circuit extending between said second and third elements, said output circuit comprising an impedance balance bridge having a galvanometer coil connected across its balance terminals and at least one pair of balance arms having a terminal common with one of said balance terminals, one of said pair of balance arms comprising an impedance and the other having said second and third elements connected therein, the ohmage of said impedance being of the same order as the ohmage across said second and third elements, whereby the output of said semi-conductor device will affect the conditions of balance of said bridge and hence the movement of said galvanometer coil, and said pyrometer circuit having a D.C. source and bias means for biasing said semi-conductor device.

4. A circuit as claimed in claim 3 in which the D.C.

source is connected across terminals of said bridge opposite said balance terminals whereby simultaneously to serve as the source of potential for said bridge.

5. A circuit as claimed in claim 3 in which said bias means includes a temperature-sensitive variable impedance to change the biasing of said semi-conductor device to compensate for changes in the output of said semi-conductor device caused by change of temperature thereof, and a heat sink being provided to maintain said cold junction, variable impedance and semi-conductor device at substantially the same temperature.

6. A circuit as claimed in claim 5 in which the variable impedance comprises a second semi-conductor device matching the first-mentioned semi-conductor device.

7. A circuit as claimed in claim 5 in which the variable impedance comprises a second semi-conductor device whose active characteristics are essentially similar over the range used with those of said first-mentioned semi-conductor device.

8. A circuit as claimed in claim 3 in which there is a series impedance in said input circuit of a value to match the total input impedance, including that of said thermocouple with the input impedance of said semi-conductor device, the series impedance being of the order of 100 times the impedance of the thermocouple.

9. A circuit as claimed in claim 3 in which there is a second semi-conductor device of construction and characteristics matching those of said first mentioned semi-conductor device, and said second semi-conductor device having an input circuit connected in parallel and substantially impedance-balanced with the said first mentioned input circuit and being biased by said bias means, and in which the said one of said pair of balance arms comprise the output of said second semi-conductor device and the said impedance is thus provided by the said second semi-conductor.

10. A pyrometer apparatus which comprises a thermocouple having a hot and a cold junction, a three-element transistor having an input circuit connected between its base and emitter with the thermocouple in series therewith and including means for biasing said input circuit, a four arm balance bridge with two pairs of opposite terminals and having a source of D.C. potential across the first pair of terminals thereof and having a galvanometer coil of relatively high critical damping resistance connected across the other pair of terminals of said bridge, two of said arms being substantially fixed impedance elements of the same order of ohmage, the emitter and collector of said transistor being connected to said bridge as a third arm, and the fourth arm having an impedance element of substantially the same ohmage as the output of said transistor.

11. A pyrometer as claimed in claim 10 in which said biasing means includes a variable impedance sensitive to temperature to vary the bias, and a heat sink is provided to maintain the transistor, variable impedance and cold junction at the same temperature.

12. A pyrometer apparatus as claimed in claim 10 in which there is a second transistor matching the first-mentioned and there is a parallel input circuit connected across the base and emitter thereof, with the emitters being connected together to form one of said first pair of terminals of said bridge, means are provided for biasing the input circuit of said second transistor, and in which the emitter and collector are connected into said bridge as the said fourth arm whereby to comprise the said impedance element thereof, a heat sink is provided to maintain said cold junction and both transistors at the same temperature, so that the transistors oppositely affect the bridge as their temperature changes.

13. A pyrometer apparatus as claimed in claim 3 in which said bias means are provided with a variable impedance and a dummy impedance matching that of said thermocouple, and switch means being provided to selectively insert said cold junction or dummy impedance in said input circuit, whereby when said dummy impedance is in said input circuit the bias may be varied to provide an output and coil movement to a position corresponding to that which would be achieved with no temperature difference between the hot and cold junctions.

14. A pyrometer circuit in which a moving coil galvanometer is calibrated to read directly the temperature of the hot junction of a thermocouple, which comprises, a thermocouple having hot and cold junctions, a pair of substantially matched transistors with their emitters connected, means applying substantially the same bias to the base-emitter circuit of each, a source of D.C. potential connected to said last means, said base-emitter circuits having impedance elements therein, the total input ohmage being the same for both transistors, but the input ohmage of the first transistor including that of said thermocouple and said thermocouple being connected in series therein, a four arm impedance bridge having a galvanometer coil connected across the balance terminals thereof and having said D.C. source connected across the potential terminals thereof, two of the four arms being resistors of substantially the same value, and two of the arms being formed by the respective emitter-collector outputs of said transistors.

15. A pyrometer apparatus comprising a thermocouple of low impedance, a moving coil galvanometer having a high critical damping resistance, and an active semi-conductor device acting as an impedance converter and amplifier connected between the thermocouple and galvanometer, the input circuit of the semi-conductor device having a resistance element and said thermocouple connected in series therein, with the resistance element having an impedance substantially higher than the impedance of the thermocouple whereby changes in the impedance of the input circuit will have negligible effect upon the response of the galvanometer.

16. A pyrometer apparatus as claimed in claim 15 in which the semi-conductor device comprises a transistor connected as a common emitter amplifier, with the thermocouple signal being injected in series with the base of the transistor.

References Cited in the file of this patent

UNITED STATES PATENTS

| Re. 23,563 | Barney | Oct. 14, 1952 |
| 2,475,238 | Hall et al. | July 5, 1949 |
| 2,690,076 | Hovnanian | Sept. 28, 1954 |
| 2,808,471 | Poucel et al. | Oct. 1, 1957 |
| 2,851,542 | Lohman | Sept. 9, 1958 |
| 2,897,720 | Offner | Aug. 4, 1959 |

OTHER REFERENCES

Starke: "The Transistor D.C. Amplifier," Radio and Television News, December 1953, pp. 82–83, 148, 149, 151. (Copy available in Div. 69.)

Potok and Wales: Transistor Voltmeters, volume 27, Electronic Engineering, pages 344, 345, 346, August 1955.

Dion: "Common Emitter Transistor Amplifiers," Proceedings of the I.R.E., Jan. 1958, page 920. (Copy in 330–32.)